United States Patent
Grichine et al.

(10) Patent No.: US 12,169,286 B2
(45) Date of Patent: Dec. 17, 2024

(54) DEVICE FOR CREATING A PATTERNED EVANESCENT FIELD ON A SURFACE AND METHOD THEREFOR

(71) Applicants: UNIVERSITÉ GRENOBLE ALPES, Saint Martin d'Hères (FR); CNRS (CENTRE NATIONAL DE LA RECHERCHE SCIENTIFIQUE), Paris (FR)

(72) Inventors: Alexei Grichine, St Egrève (FR); Olivier Destaing, Grenoble (FR)

(73) Assignees: UNIVERSITÉ GRENOBLE ALPES, Saint Martin d'Hères (FR); CNRS (CENTRE NATIONAL DE LA RECHERCHE SCIENTIFIQUE), Paris (FR)

( * ) Notice: Subject to any disclaimer, the term of this patent is extended or adjusted under 35 U.S.C. 154(b) by 508 days.

(21) Appl. No.: 17/611,421

(22) PCT Filed: May 13, 2020

(86) PCT No.: PCT/IB2020/054529
§ 371 (c)(1),
(2) Date: Nov. 15, 2021

(87) PCT Pub. No.: WO2020/230051
PCT Pub. Date: Nov. 19, 2020

(65) Prior Publication Data
US 2022/0214556 A1 Jul. 7, 2022

(30) Foreign Application Priority Data

May 16, 2019 (FR) ...................................... 1905159

(51) Int. Cl.
*G02B 21/16* (2006.01)
*G01N 21/64* (2006.01)
(Continued)

(52) U.S. Cl.
CPC ......... *G02B 27/56* (2013.01); *G01N 21/6458* (2013.01); *G01N 21/648* (2013.01); *G02B 21/082* (2013.01); *G02B 21/16* (2013.01)

(58) Field of Classification Search
CPC ...... G02B 27/56; G02B 21/082; G02B 21/16; G02B 2207/113; G02B 21/00;
(Continued)

(56) References Cited

U.S. PATENT DOCUMENTS 9,535,241 B2   1/2017   Nomura et al.
9,915,815 B2   3/2018   Watanabe et al.
(Continued)

FOREIGN PATENT DOCUMENTS

CN   1588003 A   *   3/2005
JP   2004109348 A       4/2004
(Continued)

OTHER PUBLICATIONS

International Search Report for PCT/IB2020/054529 mailed Jul. 10, 2020, 7 pages.
(Continued)

*Primary Examiner* — Arnel C Lavarias
(74) *Attorney, Agent, or Firm* — NIXON & VANDERHYE

(57) ABSTRACT

A device for creating a patterned field on a diopter includes: an objective lens within whose image focal plane the surface of the diopter lies; a light injection element emitting a collimated light beam; and an optical assembly between the element and the objective lens by which the object plane of the objective lens is optically conjugate with the image plane of the element. The assembly is configured so a collimated light beam from the element is emitted towards the objective lens to be reflected towards the surface of the diopter with an angle of incidence≥the critical angle of the diopter, an
(Continued)

optical device for forming patterns is in the object plane of the element, so the pattern formed by the optical device for forming patterns in transmitted light on the light beam in the object plane of the element is on the surface of the diopter.

20 Claims, 2 Drawing Sheets

(51) Int. Cl.
*G02B 21/08* (2006.01)
*G02B 27/56* (2006.01)

(58) Field of Classification Search
CPC .............. G02B 21/0004; G02B 21/002; G02B 21/0024; G02B 21/0032; G02B 21/0052; G02B 21/006; G02B 21/0076; G02B 21/06; G02B 21/36; G02B 21/361
USPC ........ 359/385, 362, 363, 368, 369, 388, 390
See application file for complete search history.

(56) References Cited

U.S. PATENT DOCUMENTS

| | | | |
|---|---|---|---|
| 2004/0061914 | A1 | 4/2004 | Miyawaki |
| 2012/0319007 | A1 | 12/2012 | Kempe et al. |
| 2013/0068967 | A1 | 3/2013 | Kleppe et al. |
| 2013/0314775 | A1 | 11/2013 | Takamizawa |
| 2014/0126048 | A1 | 5/2014 | Nishiwaki |
| 2015/0168300 | A1* | 6/2015 | Peterson ............... G02B 21/00 356/445 |
| 2016/0131885 | A1 | 5/2016 | Nakayama |
| 2016/0259253 | A1 | 9/2016 | Luo et al. |
| 2017/0276922 | A1 | 9/2017 | Nomura et al. |

FOREIGN PATENT DOCUMENTS

| | | | | |
|---|---|---|---|---|
| JP | 2006162790 | A | | 6/2006 |
| JP | 2009042411 | A | | 2/2009 |
| JP | 2014002373 | A | | 1/2014 |
| JP | 2014092682 | A | | 5/2014 |
| JP | 2016-061967 | | | 4/2016 |
| JP | 2016061967 | A | * | 4/2016 ............ G02B 21/06 |
| WO | 2015008415 | A1 | | 1/2015 |

OTHER PUBLICATIONS

Written Opinion of the ISA for PCT/IB2020/054529 mailed Jul. 10, 2020, 9 pages.
Search Report for FR1905159 dated Jan. 30, 2020, 11 pages.
Khamo, J. S., Krishnamurthy, V. V., Sharum, S. R., Mondal, P. & Zhang, K., "Applications of Optobiology in Intact Cells and Multicellular Organisms", J. Mol. Biol. 429, 2999-3017 (2017).
Tischer, D. & Weiner, O. D., "Illuminating cell signalling with optogenetic tools", Nat. Rev. Mol. Cell Biol. 15, 551-558 (2014).
Valon, L. et al., "Predictive Spatiotemporal Manipulation of Signaling Perturbations Using Optogenetics", Biophys. J. (2015). doi:10.1016/j.bpj.2015.08.042.
Axelrod, D., "Evanescent excitation and emission in fluorescence microscopy", Biophys. J. 104, 1401-9 (2013).
Liao, Z., "Kasirer-Friede, A. & Shattil, S. J. Optogenetic interrogation of integrin αVβ3 function in endothelial cells", J. Cell Sci. 130, 3532-3541 (2017).
Rust, M. J., Bates, M. & Zhuang, X., "Sub-diffraction-limit imaging by stochastic optical reconstruction microscopy (STORM)", Nat. Methods 3, 793-796 (2006).
Betzig, E. et al., "Imaging intracellular fluorescent proteins at nanometer resolution", Science 313, 1642-5 (2006).
Brunstein, M., Teremetz, M., Hérault, K., Tourain, C. & Oheim, M., "Eliminating unwanted far-field excitation in objective-type TIRF. Part I. Identifying sources of nonevanescent excitation light", Biophys. J. 106, 1020-1032 (2014).
Brunstein, M., Hérault, K. & Oheim, M., "Eliminating unwanted far-field excitation in objective-type TIRF. Part II. Combined evanescent-wave excitation and supercritical-angle fluorescence detection improves optical sectioning", Biophys. J. 106, 1044-1056 (2014).
Ruckstuhl, T. & Verdes, D., "Supercritical angle fluorescence (SAF) microscopy", Opt. Express 12, 4246-4254 (2004).
Gustafsson, M. G., "Surpassing the lateral resolution limit by a factor of two using structured illumination microscopy", J. Microsc. 198, 82-7 (2000).
Brunstein, M., Wicker, K., Hérault, K., Heintzmann, R. & Oheim, M., "Full-field dual-color 100-nm super-resolution imaging reveals organization and dynamics of mitochondrial and ER networks", Opt. Express 21, 26162 (2013).
P. Kner et al."Live TIRF microscopy at 100 nm resolution through structured illumination", Proceedings of SPIE, 1000 20th St. Bellingham WA 98225-6705 USA vol. 7184, Feb. 12, 2009 (Feb. 12, 2009), p. 718417.
Laurence J. Young et al., "A guide to Structured Illumination TIRF Microscopy at High Speed with Multiple Colors", Journal of Visual Experiments, No. 111, May 30, 2016 (May 30, 2016).
Fiolka R et al. "Structured illumination in total internal reflection fluorescence microscopy using a spatial light modulator", Optics Letters, Optical Society of America, US vol. 33, No. 14, Jul. 15, 2008 (Jul. 15, 2008), pp. 1629-1631.
Pavel Krizek "Spatial light modulators in fluorescence microscopy", Microscopy: Science, technology, Applications and education vol. 2, Jan. 1, 2010 (Jan. 1, 2010), pp. 1366-1377.
Office Action, issued in Japanese Patent Application No. 2021-568495 dated Feb. 14, 2024.

* cited by examiner

DEVICE FOR CREATING A PATTERNED EVANESCENT FIELD ON A SURFACE AND METHOD THEREFOR

CROSS-REFERENCE REFERENCE TO RELATED APPLICATIONS

This application is the U.S. national phase of International Application No. PCT/I62020/054259 filed May 13, 2020 which designated the U.S. and claims priority to FR Patent Application No. 1905159 filed May 16, 2019, the entire contents of each of which are hereby incorporated by reference.

BACKGROUND OF THE INVENTION

Field of the Invention

Photobiology is a rapidly growing field of research, fueled by the development of several generations of photoreceptor proteins that can be activated or deactivated, change their oligomerization state, bind/dissociate from specific cellular partners, or be locally denatured in response to light stimulation. These versatile tools can be expressed in fusion with almost any cellular protein, allowing detailed functional studies of individual molecular players via their spatiotemporal activation/inactivation and a photo-manipulation within living cells or even whole organisms using light beams of specific wavelengths.

Description of the Related Art

Currently, in cultured cells, local activation is achieved by light patterning with microscopy galvanometer scanners, Spatial Light Modulators (SLM) or other Digital Micromirror Devices (DMD). A confined beam of light, orthogonal to the surface of the substrate, is then directed towards a desired cellular region. However, such a beam traverses the entire thickness of the cell and can potentially activate receptors on both the upper and lower plasma membranes as well as on the cytoplasmic or nuclear structures present between them. In addition, the rapid diffusion of cytosolic photoreceptor proteins, such as Cry2, spreads the signal generated within the focal volume to the surrounding cytosol, thus reducing the spatiotemporal resolution to a few micrometers and a few seconds. A large excitation volume also leads to significant photo-instability, photo-toxicity and thermal effect, as well as other undesirable effects, of light on living cells.

In cell signaling and mechanotransduction research, specific photoreceptors must be activated only at the basement plasma membrane (e.g., components of adhesive structures, EGF receptor, ion channels . . . ). In this case, the well-established technique of Total Internal Reflection Fluorescence (TIRF) microscopy can be used to introduce the photo-activation light as an evanescent field in the vicinity of the basement membrane. This same technique also allows the observation of the distribution of fluorophores with a very high signal to noise ratio, up to the detection of a single molecule. Surprisingly, despite the ever-increasing number of publications dealing separately with TIRF microscopy or optogenetic applications, only one recent publication combines the two techniques: "Optogenetic interrogation of integrin αVβ3 function in endothelial cells", Liao, Z., Kasirer-Friede, A. & Shattil, S. J., J. Cell Sci. 130, 3532-3541 (2017).

This illustrates the lack of spatial flexibility of current TIRF microscopy equipment. Indeed, while effectively reducing light excitation in the axial direction near the plasma membrane, current TIRF microscopes excite the entire field of view and lack lateral light control tools to create regions of interest (ROIs) with TIRF excitation.

Studies concerning intracellular signal transduction and spatiotemporal patterning, however, require localized activation in regions of subcellular dimensions. The object of the present invention is to describe a method for creating evanescent field patterns that combines the advantages of both TIRF and optogenetic techniques and allows the creation of TIRF photoactivation regions of interest on the plasma membrane, thereby reducing light excitation in three dimensions.

Fluorescence excitation by evanescent light is widely used in TIRF microscopy to specifically visualize the fluorophore-labeled basement membrane or nearby cytoskeletal structures in a living cell, in super-resolution microscopy techniques such as stochastic optical reconstruction microscopy (STORM, STochastic Optical Reconstruction Microscopy) or Photo-Activated Localization Microscopy (PALM) or to sample fluorescent solutions and thin films close to the glass substrate.

The principle of TIRF microscopy is based on a collimated beam of excitation light that reflects totally on the glass/water interface at an angle of incidence greater than the critical angle $\theta c$ approximately equal to 61°.

In the case of higher refractive index structures present on the glass, such as adherent cells, $\theta c$ can be a few degrees higher. In most popular "through-the-lens" TIRF optical setups, large numerical aperture objectives can achieve incidence angles of almost 80°, well beyond the critical value.

The characteristic penetration depth of the resulting evanescent wave into an aqueous medium or cells is then about 100 nm, while the lateral resolution, determined by the numerical aperture (NA) of the objective lens is close to 250 nm. Thus, the smallest sample volume can be less than 10 attoliters (1 attoliter representing $10^{-18}$ liters), while the total evanescent wave excitation volume is much larger (greater than 10 femtoliters, 1 femtoliter representing $10^{-15}$ liters), due to the fact that the entire field of view is excited immediately.

In order to create the evanescent field, the excitation light is focused in the Back Focal Plane (BFP) of the objective lens (also called the pupil plane) near its periphery. The light cone at this point has a very small numerical aperture (e.g. less than 0.04 in an iMIC microscope, produced by FEI Munich GmbH) and the radial position of the focal point can be adjusted with a galvanometer scanner or a prism. This leads to an evanescent wave excitation of the entire field of view by the highly tilted parallel beam, although sometimes affected by a multimodal laser beam profile or interference fringes. A more uniform illumination can be achieved by multipoint BFP focusing (TILL, produced by FEI Munich GmbH) or azimuthal rotating beam configurations (Roper Scientific equipment, currently GATACA company). Many modern commercial TIRF microscopes produce a homogeneous evanescent field of more than 100 µm in diameter that covers the entire surface of typical adherent cells. It should be noted, however, that some optical elements of the microscopes, especially those in the conjugate field planes, have been identified as sources of non-evanescent, propagating light that leads to partial far-field excitation. In order to limit this effect, the Supercritical Angle Fluorescence (SAF) imaging technique has been developed, which is based on spatial filtering of the light emitted at the BFP or at a BFP equivalent level. Thus, any element obstructing the light in the conjugate field plane in the excitation light path is in fact considered harmful for the image quality and is avoided.

Very few examples of creation of evanescent light lateral patterning have been reported. U.S. patent application US2017276922A1 describes a structured illumination microscopy technique (TIRF-SIM, from Nikkon) which takes advantage of the fact that a pair of intersecting, mutually coherent TIRF laser beams can produce an interference fringe pattern with very closely spaced bands in the evanescent intensity. These periodic bands, however, span the entire field of view and are useful for calculating the microscopy image with a factor of 2 improved resolution rather than for performing localized photoactivation. Another theoretical method has been proposed to create a very small (super-resolution) evanescent wave illumination spot by extending the idea of laser interference to an infinite number of beams or ring illumination at the objective lens BFP ("Evanescent excitation and emission in fluorescence microscopy", Axelrod, D., Biophys. J. 104, 1401-9 (2013)). Unfortunately, the resulting central spot could lead to being surrounded by the circular interference fringes, albeit with decreasing amplitudes, and the necessary polarization condition of the light ring in the BFP is not yet compatible with existing TIRF light sources.

US2016/131885 describes a device that is a multidirectional diffraction grating or a Spatial Light Modulator (SLM) that forms such a grating. It can form periodic patterns to produce diffracted light in the +1 and −1 orders under coherent illumination.

US2012/0319007A1 describes a device comprising a generator of striated patterns, which are projected "divergently" onto a sample.

SUMMARY OF THE INVENTION

The present invention aims at overcoming the disadvantages of the state of the art and therefore relates to a device for creating a patterned evanescent field on the surface of a diopter separating two media of respective refractive indices n1 and n2, characterized in that it comprises:
- an objective lens, in an image focal plane of which the surface of the diopter is arranged,
- a light injection element emitting a collimated light beam of a given diameter,
- an optical assembly between the light injection element and the objective lens whereby the object plane of the objective lens is optically conjugate with the image plane of the light injection element, the optical assembly being configured such that a collimated light beam from the light injection element is emitted towards the objective lens to be reflected back towards the surface of the diopter with a minimum angle of incidence θmin greater than or equal to the critical angle θc of the diopter so that the light beam undergoes total internal reflection at the surface of the diopter to generate an evanescent wave at the surface of the diopter,
- an optical device for forming patterns in the object plane of the light injection element, mounted off-axis with respect to the optical axis of the objective lens, so that the pattern formed by the optical device for forming patterns in transmitted light on the light beam in the object plane of the light injection element is found on the surface of the diopter.

The critical angle for the diopter is defined by $\theta c = \sin^{-1}(n1/n2)$.

It is thus possible with the invention to form an evanescent wave with a great freedom for pattern formation, which was not possible with the state of the art, since the pattern is formed upstream and can be defined very precisely.

The collimated light beam is injected at the periphery of the objective lens, thus off-axis with respect to the optical axis of the objective lens. According to one embodiment, the device further comprises at least one optical element between the object plane of the light injection element and the optical assembly for adjusting one of the improvement of the resolution of the formed pattern and the filtering of the angle of incidence of the light beam on the diopter.

This improves the pattern desired to be formed on the surface of the diopter by the evanescent wave. The invention is not limited by the number of optical elements that can be added between the light injection element and the optical assembly. Thus, for example, one could have an element for improving the resolution of the formed pattern and an element for filtering the angle of incidence of the light beam.

According to one embodiment, the at least one optical element is one of a spatial diaphragm, a filter.

According to one embodiment, the optical device for forming patterns is at least one of a diaphragm, an amplitude mask, a spatial light modulator, a micro-mirror array. In particular, the amplitude mask can be a slit, a hole or any other pattern with dimensions greater than the wavelength of the light used.

According to one embodiment, the device of the invention further comprises a laser light source for generating the collimated light beam to be injected into the light injection element. Thus, according to the invention, the collimated light is preferably, but not necessarily, a coherent light beam, in particular a laser light.

According to one embodiment, the optical assembly consists of a first intermediate lens whose object plane is optically conjugate with the image plane of the light injection element and whose image plane is optically conjugate with the object plane of the objective lens.

Preferably, the first intermediate lens can be optically conjugated with the light injection element by a second intermediate lens whose object plane corresponds to the image plane of the light injection element and whose image plane corresponds to the object plane of the first intermediate lens.

The device according to the invention can in particular be a total internal reflection fluorescence microscope, the sample corresponding to the diopter and being arranged in the image plane of the microscope objective lens, the optical assembly corresponding to the microscope optics, the light injection element being arranged upstream of the microscope optics or being integrated into the microscope optics, the optical device for forming patterns being arranged between a light source and the light injection element or being integrated into the microscope optics.

The optical device for forming patterns is thus not a diffraction grating but an amplitude SLM that forms in the conjugate field plane one or more localized regions of interest (ROI) of arbitrary shapes. Its position shifted or off-axis with respect to the optical axis of the objective lens allows to reach the evanescent wave excitation. The Fourier image of this or these ROI, focused in the pupil plane of the objective lens, has a non-point spatial extent, which is only limited by the width of the supercritical band available in the TIRF objective lens.

The at least one optical element between the object plane of the light injection element and the optical assembly allows the selection of a spatial frequency band of light diffracted by the ROI edges, while limiting it to transmit only "supercritical" angles.

The ROI image projected in the pupil plane of the objective lens is not a point spot, but a light spot whose size is limited by the space available in the supercritical fringe of a TIRF objective lens.

This spot ensures the transmission of the spatial frequencies of the pattern, which is sufficient information for the reconstruction of its image localized on the diopter constituted by the surface S.

The device of the invention thus allows a photomanipulation, a local, subcellular, optogenetic photostimulation with an evanescent wave, laterally and axially limited in 3 dimensions.

The present invention also relates to a method of creating a patterned evanescent field on a surface using a device as previously defined, characterized in that it comprises the steps of:
- arranging the surface on the image plane of the lens;
- forming the desired amplitude pattern in transmitted light in the object plane of the light injection element using the device for forming patterns;
- inject a collimated light beam into the light injection element.

According to one embodiment, the surface evanescent field is created on a biological sample to selectively excite specific surface regions of the biological sample by photoactivation according to the created evanescent field.

The present invention can particularly find application in biology, for example to selectively activate with a chosen pattern proteins placed on the surface of the diopter, but can also find application in thin film photolithography or other surface photochemistry methods using evanescent waves, microscopy and regiospecific photostimulation of nanoparticles, creation of nanofilms and nano-objects between liquid phases forming the diopter, etching of barcodes, grids or other micrometric patterns on photosensitive surfaces, regiospecific evolutions of surface plasmon resonance technologies, development of regiospecific activation in evanescent wave sensors, regionalization of evanescent wave generation, confinement and manipulation of light by photonic crystals, integration of photonic patterns on silicon chips, development of artificial composite materials to realize new optical functions, optoelectronics, and more generally any application for which it is necessary to form evanescent waves on a surface with predetermined patterns.

The present invention therefore also has as its object the use of the device or method as described above for the applications indicated above, and in particular photomanipulation, local optogenetic photostimulation, subcellular optogenetic photostimulation, with an evanescent wave, laterally and axially limited in 3 dimensions, by placing the appropriate structure on the surface of the diopter.

BRIEF DESCRIPTION OF THE DRAWINGS

To better illustrate the object of the present invention, particular embodiments are described below, by way of illustration and not limitation, with reference to the attached drawings.

On these drawings.

DESCRIPTION OF THE PREFERRED EMBODIMENTS

Figure 1:
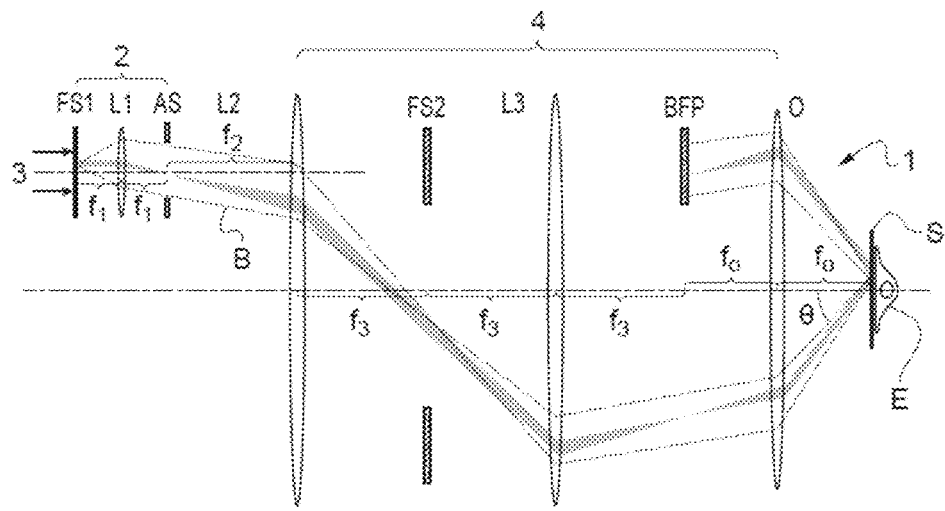
FIG. 1 is a schematic diagram of a device according to a first embodiment of the present invention.

Referring to FIG. 1, we can see that a device 1 for creating a patterned evanescent field on a surface S is shown.

The surface S is a diopter separating two media of different refractive indices n1 and n2.

In the non-limiting embodiment shown, a sample E has been placed on the surface S, the sample E here being a cell whose surface proteins are desired to be activated by evanescent wave formation on the surface S.

In this first embodiment of the device 1 according to the invention, a light injection element 2, constituted by a light source 3 generating a collimated, preferably coherent, light beam and a lens L1 of focal length f1, creates a collimated light beam B towards an optical assembly 4, constituted by a doublet of lenses L2 and L3, of respective focal lengths f2 and f3, the image plane of the lens L2 corresponding to the object plane of the lens L3. The image focal plane of the light injection element 2 corresponds to the object focal plane of the lens L2.

This beam of light B is directed at the output of the optical assembly 4 towards an objective lens O of focal length fO, the object focal plane of the objective lens O corresponding to the image focal plane of the lens L3.

The collimated light beam B is injected into the optical assembly 4 off-axis with respect to the optical axis of the optical assembly 4.

The surface S is placed in the image focal plane of the objective lens O.

Furthermore, the optical assembly 4 and the objective lens O are configured so that the light beam B emitted from the optical assembly 4 towards the objective lens O is incident on the surface S with an angle greater than the critical angle $\theta c = \sin^{-1}(n1/n2)$ of the diopter constituted by the surface S in order to have a total internal reflection and to generate an evanescent wave in the sample E. The injection of the light beam B in an off-axis way with respect to the optical axis of the optical assembly 4 allows an incidence of the latter at the output of the optical assembly 4 on the peripheral part of the objective lens O. The light beam B reflected by the surface S is reflected to the objective lens O to be focused in the back focal plane BFP of the objective lens O as a divergent and non-parallel beam, the size of the Fourier image of the pattern, formed in the periphery of the back focal plane BFP, not being punctual, but limited by the thickness of the available supercritical margin. Thus, the light beam B from the optical assembly 4 is not incident on the objective lens O along its optical axis, but is incident on the objective lens O at its periphery, allowing reflection on the surface S at an angle greater than the critical angle $\theta c$. Thus what is projected onto the objective lens O and reflected on the surface S is directly the pattern we are trying to form, already formed in the light beam B.

Contrary to the previous state of the art, the pattern to be formed on the surface S is formed upstream of the objective lens, and does not result from an optical interference formed on the objective lens by one or more incident beams.

An element FS1 for forming patterns is placed in the object focal plane of the lens L1 and is used to form, from the light from the source 3, a collimated light beam B with a pattern formed therein which, via the optical assembly 4 and the objective lens, will be formed on the surface S in order to generate a patterned evanescent wave thereon.

The element FS1 for forming patterns may in particular be a field diaphragm, but could also be, without departing from the scope of the present invention, a diaphragm, an amplitude mask, a spatial light modulator, a micro-mirror array.

The aperture diaphragm AS in the image focal plane of the L1 lens serves to filter the light reflected from the edges of the field diaphragm FS1, to ensure that the light arrives on the surface S at an angle greater than or equal to the critical angle θc, so as not to produce far-field excitation. Even if the sharpness of the pattern edges in the plane of the sample E decreases with decreasing aperture of the aperture diaphragm AS, it was found experimentally that it was possible to form patterns for regions of dimensions larger than the wavelength of the light beam, including regions of dimensions 5-10 times the wavelength of the light beam B (regions of size 3-5 μm with excitation at 515 nm).

Figure 2:
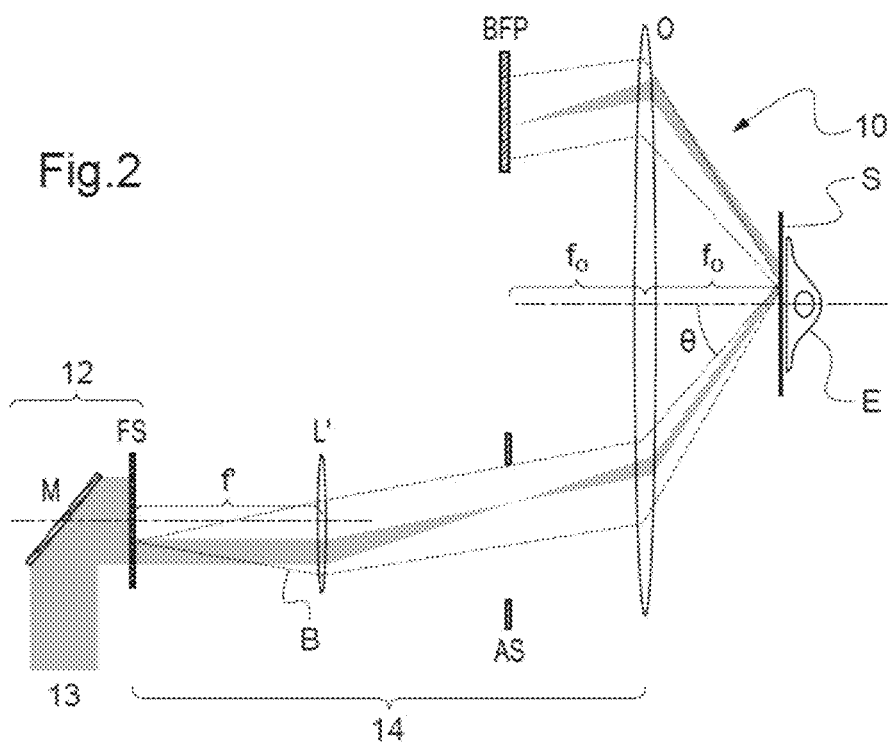
FIG. 2 is a schematic diagram of a device according to a first variant of a second embodiment of the present invention.

In this first embodiment, the optical assembly and objective lens may, for example, be integrated into an existing microscope. The invention then allows, from an existing microscope, to form a pattern on the surface S, without having to touch the optics of the microscope, from only the outside of the microscope. This embodiment avoids any occlusion of the optical path and therefore maintains the aperture, sensitivity and resolution of the microscope. This avoids any reduction in the detection channel. Referring to FIG. 2, it can be seen that a device 10 according to a first variant of a second embodiment of the invention has been shown.

In this first variant, the light source 13 emits a collimated beam of light towards the mirror M, the mirror M reflecting the beam towards a field diaphragm FS. In this variant, the light injection element is constituted by the mirror M. It should be noted that the light could also be collimated at the output of an optical fiber directly in the microscope stand, or introduced and collimated by any other suitable optical means.

Through a lens L', of focal length f', constituting the optical assembly 14, the light beam B coming from the field diaphragm FS is sent towards the objective lens O, always to arrive on the surface S with an angle of incidence θ greater than the critical angle θc to generate a total internal reflection on the surface S and an evanescent wave therein, the beam reflected by the surface S towards the objective lens O being focused on the back focal plane BFP of the objective lens O. As in the first embodiment, the aperture diaphragm AS allows to filter the light reflected from the edges of the aperture diaphragm FS to allow only rays with an angle of incidence greater than the critical angle θc to pass. Also as in the first embodiment, the light beam is off-axis with respect to the optical axis of the objective lens O, to be incident on the objective lens O at its periphery and to be reflected by the surface S with an angle greater than or equal to the critical angle θc. This assembly could, for example, be integrated directly into new types of microscopes.

Figure 3:
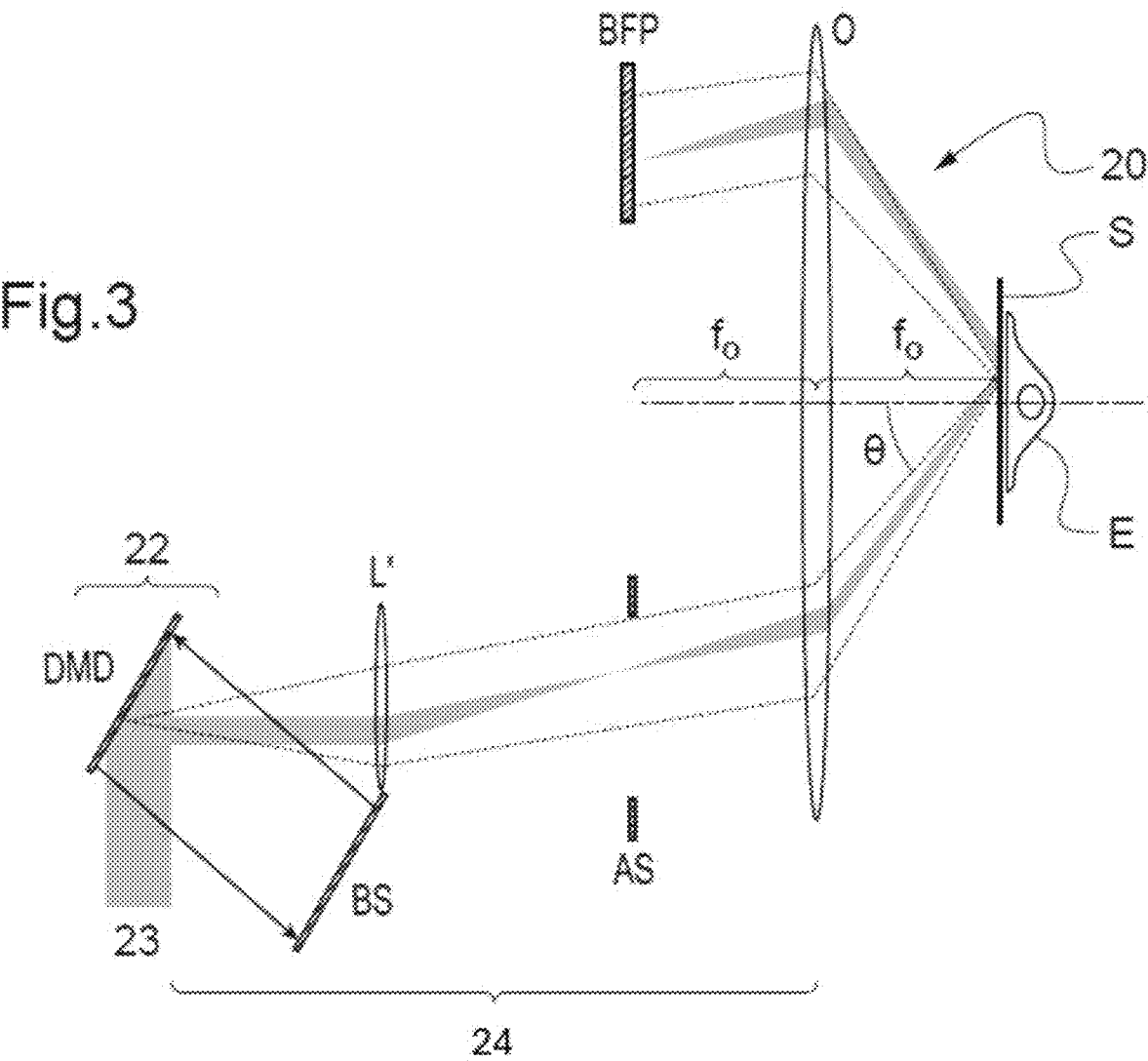
FIG. 3 is a schematic diagram of a device according to a second variant of the second embodiment of the present invention.

FIG. 3 is a variant of FIG. 2 of a device 20 according to a second variant of the second embodiment, and the elements bearing the same reference will not be described further. The difference lies in the means of forming a pattern upstream of the optical assembly 24, the pattern being formed here by reflection of collimated light from the light source 23 onto a digital micromirror DMD, said digital micromirror DMD reflecting the light to a device BS for forming patterns reflecting only a portion of the light received with a pattern to the digital micromirror DMD, which injects it into the lens L' in the same manner as described with reference to FIG. 2. Also as in the first embodiment, the light beam is off-axis with respect to the optical axis of the objective lens O, to be incident on the objective lens O at the periphery thereof and to be reflected on the surface S at an angle greater than or equal to the critical angle θc. The invention can therefore be implemented with an existing microscope, for example in the case of the first embodiment, or be integrated into a microscope, as in the case of the second embodiment.

The invention can be applied to photolithography, surface photochemistry, microscopy and regiospecific photostimulation of nanoparticles, creation of nano-films and nano-objects between liquid phases forming the diopter, etching of barcodes, grids or other micrometric patterns on photosensitive surfaces, regiospecific evolutions of surface plasmon resonance technologies, development of regiospecific activation in evanescent wave sensors, regionalization of evanescent wave production, confinement and manipulation of light by photonic crystals, integration of photonic patterns on silicon chips, development of artificial composite materials to realize new optical functions, optoelectronics.

The present invention also has a particularly interesting application in biology, e.g. for the optogenetic addressing of subcellular perimembrane structures or their formation (e.g. focal adhesion, podosome, lamellipod, endo or exocytosis vesicle, cytoskeletal anchoring), for the fine local control of cell geometry, polarity and movement, for the local activation of plasma membrane receptors (EGFR, IGFR, . . . ) or transcription factors (Stat3, 5, . . . ) without modifying their nuclear reserve (essential for analyses by Fluorescence Correlation Spectroscopy (FCS) for example), for the quantification of the subcellular signaling rate between separated membrane structures, for the structuring of cellular substrates by photolithography processes with micrometric lateral and nanometric axial resolution.

The invention claimed is:

1. Device for creating a patterned evanescent field on a surface of a diopter separating two media of respective refractive indices n1 and n2, wherein the device comprises:
   an objective lens, the surface of the diopter being arranged in an image focal plane of the objective lens,
   a light injection element emitting a collimated light beam of diameter d,
   an optical assembly between the light injection element and the objective lens whereby an object plane of the objective lens is optically conjugate with an image plane of the light injection element, the optical assembly being configured so that the collimated light beam from the light injection element is emitted towards the objective lens to be refracted towards the diopter surface with a minimum angle of incidence θmin greater than or equal to a critical angle θc so that the collimated light beam undergoes total internal reflection on the diopter surface to generate an evanescent wave on the diopter surface,
   an optical device for forming patterns in an object plane of the light injection element, which is mounted off-axis with respect to an optical axis of the objective lens, in such a way that a pattern formed by the optical device for forming patterns in transmitted light on the light beam in the object plane of the light injection element is found on the surface of the diopter, the light beam reflected by the surface being reflected towards the objective lens to be focused in a back focal plane of the objective lens, wherein the light beam reflected by the surface of the diopter towards the objective lens does not result from optical interference of one or more incident beams.

2. The device according to claim 1, further comprising at least one optical element between the object plane of the light injection element and the optical assembly configured to allow adjustment one of improvement of resolution of the formed pattern and filtering of the angle of incidence of the light beam on the diopter.

3. The device according to claim 2, wherein the at least one optical element is one of a spatial diaphragm and a filter.

4. The device according to claim 1, wherein the optical device for forming patterns is at least one of a diaphragm, an amplitude mask, a spatial light modulator, and a micro-mirror array.

5. The device according to claim 1, further comprising a laser light source configured to generate the collimated light beam to be injected into the light injection element.

6. The device according to claim 1, wherein the optical assembly comprises a first intermediate lens, an object plane of the first intermediate lens being optically conjugate with the image plane of the light injection element and an image plane of the first intermediate lens being optically conjugate with the object plane of the objective lens.

7. The device according to claim 6, wherein the first intermediate lens is optically conjugated with the light injection element by a second intermediate lens, an object plane of the second intermediate lens corresponding to the image plane of the light injection element and an image plane of the second intermediate lens corresponding to the object plane of the first intermediate lens.

8. The device according to claim 1, wherein the device is a total internal reflection fluorescence microscope, the sample corresponding to the diopter and being placed in an image plane of a microscope objective lens, the optical assembly corresponding to optics of the microscope, the light injection element being arranged upstream of the microscope, the optical device for forming patterns being arranged between a light source and the light injection element.

9. Method of creating a patterned evanescent field on a surface using the device according to claim 1, wherein the method comprises:
arranging the surface on the image plane of the objective lens;
forming a desired transmitted light amplitude pattern in the object plane of the light injection element using the optical device for forming patterns;
injecting the collimated light beam into the light injection element.

10. The method according to claim 9, wherein the surface evanescent field is created on a biological sample in order to selectively excite by photoactivation, according to the created evanescent field, specific surface regions of the biological sample.

11. The device of claim 1, wherein the device is a total internal reflection fluorescence microscope, the sample corresponding to the diopter and being placed in an image plane of a microscope objective lens, the optical assembly corresponding to optics of the microscope, the light injection element being integrated into the microscope optics, the optical device for forming patterns being integrated into the microscope optics.

12. The device according to claim 2, wherein the at least one optical element is one of a spatial diaphragm and a filter.

13. A device for creating a patterned evanescent field on a surface of a diopter separating two media of respective refractive indices n1 and n2, the device comprising:
an optical device configured for forming patterns;
a light injection element positioned so that the optical device for forming patterns is disposed in an object plane of the light injection element, such that the light injection element emits a collimated light beam, the collimated light beam having a pattern generated by the optical device configured for forming patterns formed therein;
an optical assembly arranged so that the collimated light beam passes through the optical assembly; and
an objective lens arranged so that the collimated light beam that has passed through the optical assembly passes through a periphery of the objective lens;
wherein the light injection element, the optical assembly, the objective lens, and the diopter are arranged so that:
the surface of the diopter is disposed in an image focal plane of the objective lens,
the collimated light beam that has passed through the periphery of the objective lens is incident upon the surface of the diopter with a minimum angle of incidence $\theta min$ greater than or equal to a critical angle $\theta c$ so that the collimated light beam undergoes total internal reflection on the diopter surface to generate an evanescent wave on the diopter surface,
the collimated light beam reflecting off of the surface of the diopter produces a reflected light beam that passes back through the periphery of the objective lens at a location different from a location in the periphery of the objective lens through which the collimated light beam passed,
the reflected light beam that passes back through the objective lens is focused on a back focal plane of the objective lens, and
neither the collimated light beam nor the reflected light beam passes through the objective lens at an optical axis of the objective lens.

14. A method of creating a patterned evanescent field on a surface using the device of claim 13, the method comprising:
arranging the surface on the image plane of the objective lens;
forming a desired transmitted light amplitude pattern in the object plane of the light injection element using the optical device configured for forming patterns;
injecting the collimated light beam into the light injection element.

15. The device of claim 13, further comprising at least one optical element arranged between an object plane of the light injection element and the optical assembly, the at least one optical element being configured to allow adjustment of one of resolution of the formed pattern and filtering of the angle of incidence of the collimated light beam on the diopter.

16. The device of claim 15, wherein the at least one optical element is one of a spatial diaphragm and a filter.

17. The device of claim 13, wherein optical device configured for forming patterns is at least one of a diaphragm, an amplitude mask, a spatial light modulator, and a micro-mirror array.

18. The device according to claim 13, further comprising a laser light configured to generate the collimated light beam to be injected into the light injection element.

19. The device according to claim 13, wherein the optical assembly comprises a first intermediate lens, an object plane of the first intermediate lens being optically conjugate with an image plane of the light injection element and an image plane of the first intermediate lens being optically conjugate with an object plane of the objective lens.

20. The device according to claim 19, wherein the first intermediate lens is optically conjugated with the light injection element by a second intermediate lens, an object plane of the second intermediate lens corresponding to the image plane of the light injection element and an image plane of the second intermediate lens corresponding to the object plane of the first intermediate lens.

* * * * *